(12) United States Patent
Flandermeyer et al.

(10) Patent No.: US 8,524,317 B2
(45) Date of Patent: Sep. 3, 2013

(54) COMPOSITE ARTICLE AND METHOD THEREFOR

(75) Inventors: Brian K. Flandermeyer, Rocky Hill, CT (US); Michael A. Kmetz, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 196 days.

(21) Appl. No.: 12/894,811

(22) Filed: Sep. 30, 2010

(65) Prior Publication Data

US 2012/0082832 A1   Apr. 5, 2012

(51) Int. Cl.
*B05D 3/02*   (2006.01)

(52) U.S. Cl.
USPC ........................................................... 427/226

(58) Field of Classification Search
USPC ........................................................... 427/226
See application file for complete search history.

(56) References Cited

U.S. PATENT DOCUMENTS

| | | | | |
|---|---|---|---|---|
| 5,682,594 A | * | 10/1997 | Kennedy et al. | 428/549 |
| 5,723,213 A | * | 3/1998 | Carpenter et al. | 428/336 |
| 6,350,713 B1 | | 2/2002 | Petrak | |
| 6,743,393 B1 | * | 6/2004 | Petrak | 264/625 |
| 7,306,826 B2 | | 12/2007 | Subramanian et al. | |
| 7,507,466 B2 | | 3/2009 | Steibel et al. | |
| 7,597,838 B2 | | 10/2009 | Subramanian et al. | |
| 2006/0147692 A1 | | 7/2006 | Kmetz | |
| 2009/0178618 A1 | | 7/2009 | Kmetz | |

FOREIGN PATENT DOCUMENTS

| | | |
|---|---|---|
| EP | 1679295 | 7/2006 |
| EP | 1788117 | 5/2007 |
| EP | 2028216 | 2/2009 |
| GB | 2236540 | 4/1991 |
| JP | 57077320 | 5/1982 |
| WO | 99/21805 | 5/1999 |
| WO | 2010/063946 | 6/2010 |

OTHER PUBLICATIONS

EP Search Report dated Feb. 17, 2012.

* cited by examiner

*Primary Examiner* — Michael Cleveland
*Assistant Examiner* — Robert Vetere
(74) *Attorney, Agent, or Firm* — Carlson, Gaskey & Olds, P.C.

(57) ABSTRACT

A composite article includes a substrate and a multilayer coating on the substrate. The multilayer coating includes an inner layer near the substrate, and outermost layer on the inner layer, and an intermediate layer between the inner layer and the outermost layer. The inner layer and outermost layer are boron-containing materials, and the intermediate layer is a silicon-containing ceramic material.

3 Claims, 1 Drawing Sheet

US 8,524,317 B2

COMPOSITE ARTICLE AND METHOD THEREFOR

RELATED APPLICATION

This application relates to U.S. application Ser. No. 12/689,507, filed Jan. 19, 2010.

BACKGROUND

This disclosure relates to multilayer interface coatings for composite articles.

Components, such as aircraft, aerospace, and structural components, are often fabricated from ceramic matrix composite materials that include ceramic fibers dispersed within a ceramic matrix. The composite may include an interfacial coating between the ceramic fibers and the ceramic matrix to obtain a desired degree of interfacial bonding.

SUMMARY

Disclosed is a composite article that includes a substrate and a multilayer coating on the substrate. The multilayer coating includes an inner layer near the substrate, an outermost layer on the inner layer, and an intermediate layer between the inner layer and the outermost layer. The inner layer and the outermost layer are boron-containing materials, and the intermediate layer is a silicon-containing ceramic material.

In another aspect, a disclosed composite article includes a ceramic matrix and reinforcement fibers dispersed within the ceramic matrix. A triplex coating is located between the reinforcement fibers and the ceramic matrix. The triplex coating includes a boron nitride layer interfaced with the reinforcement fibers, a boron-containing layer interfaced with the ceramic matrix, and an intermediate silicon-containing layer between the boron nitride layer and the boron-containing layer.

An example method for forming a composite article includes impregnating open pores between reinforcement fibers with a preceramic polymer material, converting the preceramic polymer material to a ceramic matrix material and, during the conversion of the preceramic polymer material, consuming the outermost layer of boron-containing material in a reaction with the preceramic polymer material to thereby limit any reaction between the preceramic polymer material and the reinforcement fibers.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
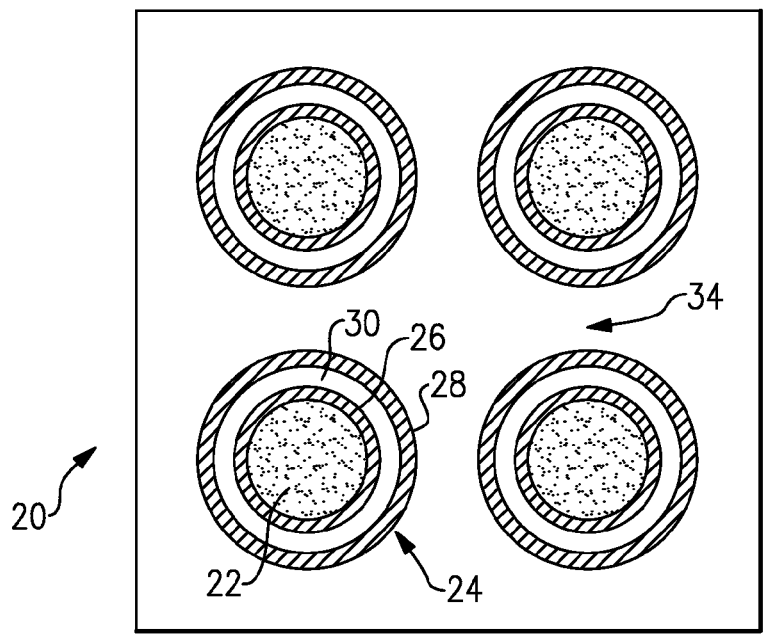
FIG. 1 illustrates an example composite article having a multilayer coating.

FIG. 1 illustrates an example composite article 20. The composite article 20 may be an aircraft component, aerospace component, or structural component and is not limited to any particular kind of component. In one example, the composite article 20 is a turbine engine component. As shown, the composite article 20 may be considered to be an end use article or an intermediate workpiece for producing an end use article.

In the illustrated example, the composite article 20 includes a substrate 22 and a multilayer coating 24 on the substrate 22. For instance, the substrate 22 in the illustrated example is a fiber structure, such as a continuous fiber fabric cloth material. The multilayer coating 24 is deposited onto the surfaces of the substrate 22. In the embodiment of a fiber structure, the multilayer coating 24 is deposited onto the surfaces of the fibers. That is, the fiber structure may be a three-dimensional structure and the multilayer coating 24 may be deposited onto the surfaces of the fibers throughout the three dimensional structure.

The multilayer coating 24 includes an inner layer 26 that is located nearest the substrate 22, an outermost layer 28 that is located on the inner layer 26, and an intermediate layer 30 located between the inner layer 26 and the outermost layer 28. The inner layer 26 need not be in contact with the substrate 22, but the inner layer 26 is the closest in proximity to the substrate 22.

Each of the inner layer 26, outermost layer 28, and intermediate layer 30 may be regarded as a coating that has a generally uniform thickness around the respective fibers. Additionally, in this disclosure, the term "outermost" refers to the layer of the multilayer coating 24 that does not have any other layers of the multilayer coating 24 over it.

In the illustrated example, the multilayer coating 24 is a triplex coating and includes only the inner layer 26, outermost layer 28, and intermediate layer 30. In this regard, the inner layer 26 is an innermost layer that is interfaced with (i.e., in contact with) the surface of the substrate 22, such as the fiber surfaces. The intermediate layer 30 is interfaced with the inner layer 26 and the outermost layer 28. The outermost layer 28 may be interfaced with a ceramic matrix material 32 (see FIG. 2), if used, as will be described below. The ceramic matrix material 32 is not regarded as being part of the multilayer coating 24. Although the multilayer coating 24 includes only three layers, given this description, one of ordinary skill in the art will recognize the suitability of using additional layers between the fibers and the outermost layer 28.

If the substrate is a fiber structure, the fibers may be a material selected from oxides, nitrides, carbides, borides, or combinations thereof. In a further example, the fibers may be carbon fibers, silicon carbide fibers (SiC), aluminum silicate fibers (mullite, $Al_6Si_2O_{13}$), alumina fibers ($Al_2O_3$), silicon oxynitride fibers, or combinations thereof. In one particular example, the fibers are silicon carbide fibers (e.g., NICALON), which are particularly desired in aircraft and aerospace applications.

The inner layer 26 and the outermost layer 28 are boron-containing materials, and the intermediate layer 30 is a silicon-containing ceramic material. As an example, the boron-containing material of the inner layer 26 and the outermost layer 28 is boron nitride (BN), and the silicon-containing ceramic material of the intermediate layer 30 is silicon nitride ($Si_3N_4$). Alternatively, the silicon-containing ceramic material may be silicon carbide or silicon carbonitride. A user may form the multilayer coating 24 using known chemical vapor deposition techniques to deposit layers of the boron-containing material and silicon-containing ceramic material.

Generally, boron-containing materials such as boron nitride, relatively easily convert to oxides upon exposure to moisture and heat. The silicon-containing ceramic material of the intermediate layer 30 serves to protect the underlying inner layer 26 from moisture exposure. However, as will be described below, a silicon-containing ceramic layer alone does not protect against other phenomenon such as "eyebrowing."

The multilayer coating 24 also includes open pore space 34 between the fibers of the composite article 20. The size of the open pore space 34 may be designed to avoid bridging between the multilayer coating 24 and thereby permit infiltration of a matrix material, as will be described in further detail below. To maintain a suitable size of the open pore space, the individual thicknesses of the inner layer 26 and the outermost layer 28 may be approximately 50-150 nanometers and the thickness of the intermediate layer 30 may be approximately 100-500 nanometers. In one particular example, the outermost layer 28 is thicker than the inner layer 26, to serve as a sacrificial layer as described below. In another example, the total thickness of the multilayer coating 24 from the inner surface of the inner layer 26 to the outer surface of the outermost layer 28 is approximately 200 nanometers.

Alternatively, a user may design the thicknesses of the inner layer 26, the outermost layer 28, and the intermediate layer 30 to be within a nominal ratio. For instance, a thickness ratio $t_1$ of the intermediate layer 30 to the inner layer 26 and a thickness ratio $t_2$ of the intermediate layer 30 to the outermost layer 28 may each be 0.67-10. In a further example, the thickness ratios $t_1$ and $t_2$ may be 1-4. That is, the intermediate layer 30 is generally thicker than either the inner layer 26 or the outermost layer 28. In one particular example, the thickness ratio $t_2$ is greater than the thickness ratio $t_1$.

Figure 2:
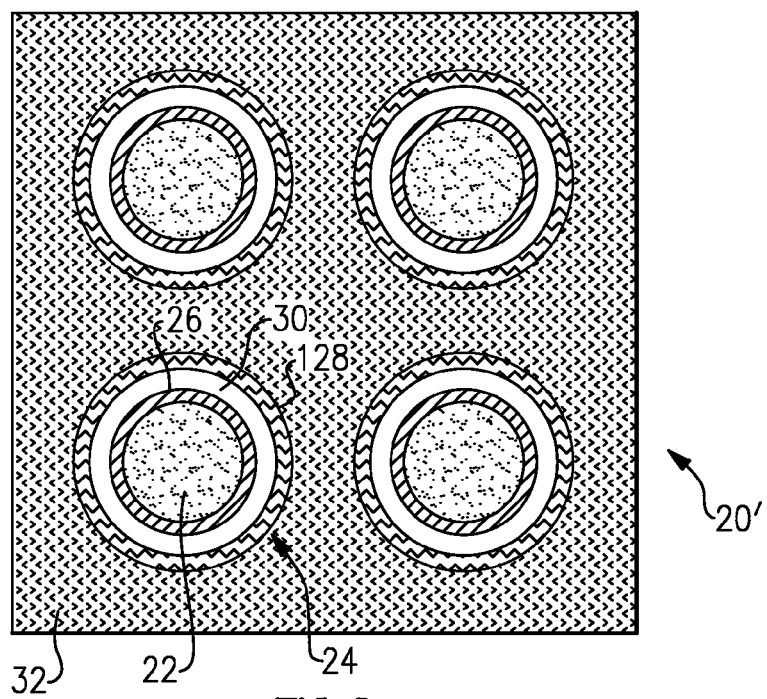
FIG. 2 illustrates another example composite article having a multilayer coating.

FIG. 2 illustrates an example of a modified composite article 20'. In this embodiment, the open pore space 34 that was previously between the fibers and multilayer coating 24 on the fibers is filled with a ceramic matrix material 32. For instance, a user may infiltrate a preform of the fiber structure and multilayer coating 24 with a preceramic polymer material to form the ceramic matrix material 32. The user then heats the preceramic polymer to convert the preceramic polymer to the ceramic matrix material 32 (e.g., polymer impregnation pyrolysis). The preceramic polymer selected depends upon the type of ceramic matrix material 32 that is desired. In one example, the preceramic polymer is one that converts to silicon carbonitride.

During the conversion process, the preceramic polymer reacts with the boron-containing material of the outermost layer 28 to form a reaction product of those materials as the outermost layer 128. In that regard, the boron-containing material of the outermost layer 28 is at least partially consumed in the reaction with the preceramic polymer. The consumption of the outermost layer 28 limits any reaction between the preceramic polymer and the underlying substrate 22 or fiber. Thus, the boron-containing material of the outermost layer 28 serves as a sacrificial layer to preserve the mechanical integrity of the underlying fibers and boron-containing material of the inner layer 26.

The reaction product that forms the outermost layer 128 may be a borosilicate glass. The consumption of the outermost layer 28 to form the borosilicate glass alleviates delamination of the multilayer coating 24 during the polymer infiltration process to form the ceramic matrix material 32 and serves as an environmental protection layer such that the composite article 20' exhibits improved resistance to environmental condition that degrade single layer interface coatings and boron nitride/silicon nitride coatings.

As an example, repeated cycles of impregnating the open pore space 34 between the fibers and converting the preceramic polymer material to the ceramic matrix material 32 consumes the outermost layer 28 and limits or avoids reaction with the intermediate layer 30 that might otherwise operate to delaminate the inner layer 26 from the surface of the substrate 22 or fiber. In comparison, the process to impregnate a composite that uses only a single BN layer or a multilayer BN/silicon nitride causes the BN layer to delaminate, or "eyebrow," from the underlying fibers. The eyebrowing allows the preceramic polymer to infiltrate between the fibers and the BN layer. The preceramic polymer undesirably reacts with the fiber to degrade the fiber properties. However, the sacrificial consumption of the outermost layer 28 (e.g., from boron nitride to borosilicate glass) disclosed herein alleviates the phenomenon of eyebrowing by preferentially reacting with the preceramic polymer and forming a protective borosilicate glass. The inner layer 26 and substrate 22 are thereby preserved such that the composite article 20 or 20' maintains a desired degree of interfacial bonding and mechanical properties.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for forming a composite article from a workpiece that includes reinforcement fibers and a multilayer coating on the reinforcement fibers, wherein the multilayer coating includes an inner layer, an outermost layer on the inner layer, and an intermediate layer between the inner layer and the outermost layer, and the inner layer and the outermost layer are boron-containing materials and the intermediate layer is a silicon-containing ceramic material, the method comprising:
    (a) impregnating open pores between the reinforcement fibers with a preceramic polymer material;
    (b) converting the preceramic polymer material to a ceramic matrix material; and
    (c) during the conversion of the preceramic polymer material, consuming the outermost layer of boron-containing material in a reaction with the preceramic polymer material to thereby limit any reaction between the preceramic polymer material and the reinforcement fibers.

2. The method as recited in claim 1, including repeating steps (a) and (b).

3. The method as recited in claim 1, wherein the preceramic polymer material is a precursor to silicon carbonitride.

* * * * *